C. F. BURGESS.
BATTERY.
APPLICATION FILED DEC. 10, 1913.
1,162,449.
Patented Nov. 30, 1915.
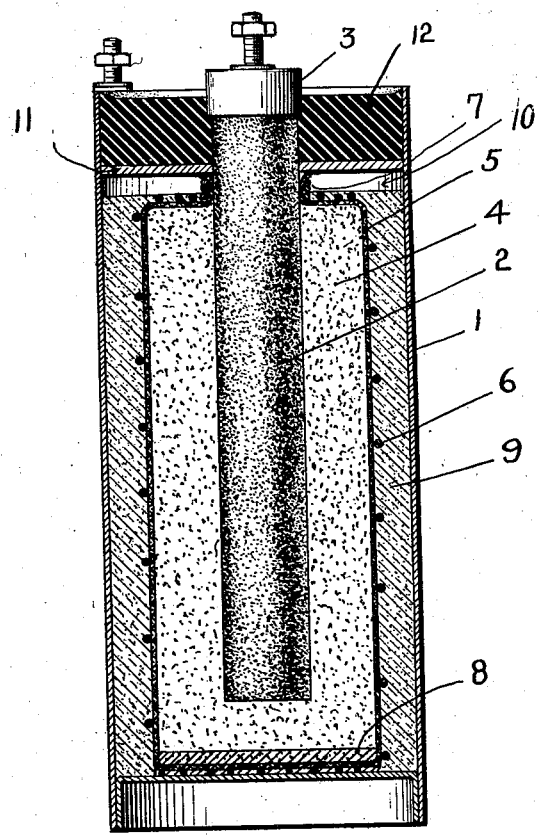
WITNESSES
INVENTOR
Charles F. Burgess
BY
ATTORNEY

UNITED STATES PATENT OFFICE.

CHARLES F. BURGESS, OF MADISON, WISCONSIN, ASSIGNOR TO C. F. BURGESS LABORATORIES, A CORPORATION OF WISCONSIN.

BATTERY.

1,162,449. Specification of Letters Patent. Patented Nov. 30, 1915.

Application filed December 10, 1913. Serial No. 805,675.

*To all whom it may concern:*

Be it known that I, CHARLES F. BURGESS, a citizen of the United States, residing at Madison, county of Dane, State of Wisconsin, have invented certain new and useful Improvements in Batteries; and I do hereby declare the following to be a full, clear, and exact description of the invention, such as will enable others skilled in the art to which it appertains to make and use the same.

The present invention relates to dry batteries of the Le Clanche type, wherein one electrode is of zinc and the other is of carbonaceous material, and the electrolyte consists of a solution of ammonium chlorid with zinc chlorid added as desired, and wherein a solid depolarizing material is present at one electrode to oxidize the hydrogen there set free.

It is the object of the present invention to increase the efficiency and capacity of such batteries by improvements in their mechanical construction and in the arrangement of parts, but more particularly to improve them in such a way as to obtain larger current output, quicker recovery, better internal conductivity, and greater reliability. As contributing to these ends, and as an important factor in obtaining the results desired, I make use of a new depolarizing mixture containing carbonaceous material and a manganese depolarizer, the carbonaceous material being in graphitic form and in an extremely fine state of subdivision, and the manganese depolarizer being of such character as to coöperate to good advantage with this graphite.

In the accompanying drawing, forming part of this specification, there is illustrated in enlarged cross-section a battery or cell built in accordance with my present invention. This particular cell is of the miniature type suited for use with portable hand lamps, but my invention can be used in batteries of larger size, such as those commonly used for telephone and ignition work.

In the drawing, the cell comprises a zinc container 1 of usual construction within which is a carbon rod 2 with a brass terminal cap 3, this rod being closely enveloped by a tightly compressed block 4 of depolarizing mixture. Enveloping the block 4 of depolarizing mixture may be and preferably is an envelop 5 of bibulous material, such as cloth gauze, which may be slipped over the block 4 after the latter has been tightly compressed about its carbon rod 2. A winding 6 of thread or string may hold the envelop in the form of a bag gathered together and tied tightly about the carbon rod at 7.

To prevent local action by the close proximity of the depolarizing mixture with the bottom of the zinc container, compared with its proximity to the side wall, the lower part of the gauze envelop is impregnated with paraffin at 8. Furthermore, in using the exceedingly fine graphite here contemplated, there is danger, except for the paraffin, that the graphite, by migration or otherwise, will pass over to the zinc surface and so cause rapid shelf deterioration. The finer the graphite the greater is the liability to trouble from this cause unless special precautions are taken.

To assemble the cell, the carbon rod 2 with its compressed block 4 and gauze envelop is introduced into the zinc container until it rests on the bottom thereof, and a paste 9 is poured in to fill the annular space between the envelop and the zinc container. Preferably a starch water paste is used, containing ammonium chlorid and zinc chlorid in such proportions that upon standing for a few minutes the paste gelatinizes and becomes semisolid.

The starch paste is poured in until it completely covers the top of block 4, and above the top of the starch paste, with an air gap 10 intervening, is introduced a paraffin washer 11 above which the cell is filled up with a pitch seal 12 substantially to the top of the zinc container, and with brass cap 3 projecting upwardly through the pitch, so that contact may be established with the external circuit.

The depolarizing mixture whereon the improved action of this cell is largely dependent, consists of carbonaceous material and a manganese depolarizer, and also may contain the usual electrolyte-forming salts, such as sal ammoniac and zinc chlorid, together with the necessary water.

The quality of the carbonaceous material is a vital factor in the operation of the battery of my invention, and although the characteristics of the material which is used are somewhat difficult of definition, and the reasons for the advantageous results are in some respects obscure, nevertheless the disclosures hereinafter made will enable those skilled in the art to construct batteries far superior to those heretofore commonly made; not only in the current output obtainable, but also in recovering power and ability to resist deterioration while in storage. For instance, batteries for ignition use, known to the trade as "No. 6" batteries, and having dimensions approximately six inches high and two and one-half inches in diameter, when connected to a four ohm resistance will drop to 0.75 volt in 40 hours of continuous discharge; whereas batteries of the same dimensions and built in accordance with my present invention will operate continuously on the same resistance for 150 hours before dropping to 0.75 volt.

The carbonaceous material used by me is graphitic in character, and for a complete understanding of its characteristics and its relation to various kinds of graphite heretofore used, it is desirable to set forth herein some of the distinguishing characteristics of various kinds of graphite.

In the following table appear data on ten kinds of graphite together with an enumeration of their respective characteristics. These various materials were obtained from the International Acheson Graphite Company of Niagara Falls, and are designated by their trade numbers:

| Grade, trade No. | Fineness. | Per cent. ash. | Electrical resistance. | Relative volume dry. | Relative volume in water. |
|---|---|---|---|---|---|
| BA—2 | 92 | 7.20 | .160 | .935 | 3.2 |
| BB—1 | 83 | 2.61 | .087 | .93 | 3.2 |
| BE—1 | 96 | 4.46 | .160 | 1.04 | 3.4 |
| 615 | 99.5 | .77 | .115 | 1.38 | 4.6 |
| 2301 | 99.5 | .00 | .128 | 1.34 | 5.3 |
| 697 | 88 | 3.50 | .135 | .915 | 2.5 |
| 1340 | 99.5 | .22 | .100 | 1.41 | 5.3 |
| 575 | 99 | .52 | .140 | 1.21 | 5.6 |
| A—3 | Impalpable. | 9.55 | .568 | 2.18 | 14.5 |
| 750 | " | 6.30 | .434 | 2.28 | 14.8 |

In the above table the fineness is expressed in the percentage of material which will pass through a sieve with 200 meshes per lineal inch, a standard method of grading. The ash is determined by ordinary methods of analyses. The electrical resistance is measured with the dry material held in a tubular cylinder one inch in diameter and there subjected to a pressure of twenty pounds between two graphite electrodes. By measuring the electrical resistance of the material held between two electrodes, the values given in the above table were determined and are expressed in ohms per lineal inch of column one inch in diameter.

The relative volume dry is determined by placing ten grams of graphite in a cylinder one inch in diameter and tapping the container until the material settles to a constant volume. The figures in the above table indicate the height in inches occupied by the ten grams of graphite.

The relative volume in water as given in the above table is determined by placing one gram of graphite in a 25 cubic centimeter graduated glass cylinder having an internal diameter about 11/16", adding water so that the total volume is 25 cubic centimeters and allowing the graphite to settle for one hour. The apparent volume of the settled graphite is then measured on the graduated scale and the figures in the above table indicate in cubic centimeters the volume occupied by one gram of graphite after settling for one hour in 25 cubic centimeters of water.

Of the several grades of graphite appearing in the table the first seven are listed by the International Acheson Graphite Company as being battery grades, and the first two are the grades which have been in most general use in this country for the manufacture of standard size of dry batteries. The last two grades are the kind used by me in accordance with this invention. By reference to the table it will be seen that these two grades used by me have certain distinctive properties, being distinctly finer than all the others—in fact so fine that they cannot be designated except by the term "impalpable". That is the term under which they are sold by the International Acheson Graphite Company, and in the claims of this specification where the term "impalpable" is used I have reference to materials much finer than even those grades of Acheson graphite which are graded by passing through a 200 mesh sieve. This impalpable grade may be further distinguished by its light fluffy character, which gives it great bulk as compared with some of the coarser grades and which gives to it an apparently low specific gravity. The great difference in the fineness of the impalpable graphite and that of the 200 mesh graphite heretofore used can be readily detected by means of a high power microscope. It is difficult, if not impossible, to give the exact dimensions of the particles; but it is my present belief that they are of less than 1/2000th of an inch in diameter. The difference can better be detected by the method of settling out of water in the manner indicated for determining the figures in the last column of the above table. From this it is seen that the volume occupied by the impalpable powder is from three to five times that occupied by the commonly used grades.

By reference to the above table it will be seen that the electrical resistance of the graphite used by me is approximately four times that of graphites as heretofore used. It is not certain that this is a characteristic of the graphite itself but may be due to its extreme fineness and to the greater number of contacts presented to the flow of current when the resistance measurement is made with the graphite dried and under pressure. High resistance has heretofore been generally accepted as indicating inferiority in graphite for battery use, but with my materials I have found that in spite of this apparent inferiority as regards resistance the impalpable graphite possesses striking advantageous characteristics which I have discovered and which make it possible to impart the exceptional qualities to dry cells by its use.

As to depolarizing material for use with the graphite a considerable variety of materials is available, for the peculiar characteristics of the graphite used by me are such that any one of several grades of depolarizing compounds can be used with satisfaction. I may use pyrolusite or natural manganese dioxid or I may use artificial or recovered manganese from any one of several different sources as claimed more particularly in my co-pending application, Serial No. 862,284, filed September 18, 1914, as a division hereof. Artificial manganese is obtainable as a by-product from several different industrial processes, such as the manufacture of chlorin, and bleaching powder, and saccharin, and in this country has been marketed for many years under the name "recovered" manganese by chemical houses including Harshaw, Fuller & Goodwin Company of Cleveland, Ohio, John S. Lamson & Bro., of New York and The Roessler & Hasslacher Chemical Company, of New York.

In using any one of the several kinds or grades of manganese depolarizer it is advisable to recognize its particular individual characteristics and to control the proportions of the mix and other details to meet the needs of that particular depolarizer. Among those important characteristics of the manganese depolarizer are (1) density, (2) fineness, (3) degree of hydration. Pyrolusite has a greater density than the other forms of manganese and requires a smaller percentage by weight of the impalpable graphite than do other forms of manganese of a lower specific gravity. A suitable mixture may be made in the proportions of 100 grams impalpable graphite, 21 grams pyrolusite, 13 grams ammonium chlorid, and 15 grams water.

The pyrolusite as supplied on the market is much coarser than are the various grades of recovered manganese. A common degree of fineness of pyrolusite is that defined as material which passes through a 40 mesh screen. Recovered manganese, being formed by a chemical precipitation process, consisting of much more minute particles than those which just pass through such a screen, and the relative degree of fineness has much to do with the relative proportions of impalpable graphite which must be added to produce the best results.

As to degree of hydration, this is less in pyrolusite than in artificial or recovered manganese in general, and since with the use of pyrolusite it is only the hydrated material which participates in the depolarizing action (though some of the unhydrated may become hydrated by secondary action, and later become available for delivering oxygen to combine with the hydrogen resulting from the flow of current) the proportion of pyrolusite, weight for weight, should be greater than when the more highly hydrated depolarizers are used. For instance, using a standard grade of recovered manganese, a suitable mixture is as follows: 12 grams impalpable graphite, 36 grams recovered manganese, 3.5 grams ammonium chlorid, 3.3 grams zinc chlorid, 12 grams water.

Throughout the scientific literature relating to Le Clanche cells the term "manganese" is freely used to designate pyrolusite, which is manganese dioxid $MnO_2$ partially hydrated. In elementary text books the chemistry of depolarization is commonly said to result from the chemical union of the electrolytic hydrogen with oxygen given up by the manganese dioxid, but for several years it has been recognized by electro-chemists that the reaction is more complex than this and involves the union of hydrogen with the OH radical of the pyrolusite or other manganese depolarizer, necessitating therefore the presence of manganese oxid in a hydrated form, such as is present in pyrolusite, (and even in the ore before washing and grinding), and such as is present in the various kinds of recovered manganese now obtainable on the market.

Without desiring to be limited by any particular theory for the cause of the beneficial effects which I have been able to produce as above described, one explanation may be presented as follows: In spite of the apparent high resistance of the impalpable graphite, it gives excellent characteristics to the mix which goes into the dry cell construction, partly by flowing readily into interstices between the manganese particles, thereby forming a more homogeneous and continuous path for the flow of current to the carbon rod, than would be the case were graphite in larger particles employed, and partly by the increased effectiveness of the depolarizer when the materials are in this most intimate contact.

The conductivity of graphite, even the impalpable forms, is of such a high order as compared with the conductivity of pyrolusite or of recovered manganese (about in the relation of 10,000 and over to one) that the graphite must be relied upon entirely as the conducting medium for the flow of current through the mixture which surrounds the carbon rod of the battery. The electrical resistance of pyrolusite measured according to the method above outlined for resistance measurements of graphite is from 3,500 to 10,000 ohms per lineal inch, or a conductivity less than 1/10,000 of that of graphite. Recovered manganese in its more common forms has even less conductivity, and by the above designated mode of resistance measurement a typical material which has been extensively employed by me has a resistance of 136,000 ohms per lineal inch, or a conductivity less than 1/270,000 that of the impalpable graphite and less than 1/20th that of pyrolusite.

The effectiveness of depolarizing material is dependent upon the intimacy of its contact with the conductive graphite, and this intimacy of contact is greater where the impalpable graphite is used than where the coarser grade is employed. The capacity of a dry cell for delivering current is determined, in a measure, by the amount of water which the depolarizing mixture will hold. This amount of water is greater with the use of the impalpable graphite than with the use of the coarser grades, as is evidenced by the greater absorption of water which the impalpable material possesses.

The above disclosure sets forth all of the data necessary to enable those skilled in the art to practise my invention, irrespective of the origin of the manganese depolarizer, and whether pyrolusite is used or the more finely divided "recovered" manganese. It has been found in practice that the recovered manganese varies somewhat in purity depending upon its origin, and it is good practice in preparing it for the battery to wash it with water and so take out any soluble impurities that may be present, after which the residue may be dried and put into such physical condition that it may be readily mixed with the other ingredients.

In the commercial manufacture of batteries according to my process, the impalpable graphite has been obtained from the International Acheson Graphite Company, it being a secondary product resulting from their methods of air separation.

I claim:

1. A dry battery, having a depolarizing mixture consisting of impalpable graphite with a manganese depolarizer and suitable salts and water.

2. In a dry battery, a depolarizing mixture containing a carbonaceous conductive material of which at least 30 per cent. is in the form of an impalpable powder.

3. A depolarizing mixture for batteries consisting essentially of impalpable graphite, a manganese depolarizer in part hydrated, and usual salts and water.

4. A depolarizing mixture for dry batteries consisting of carbonaceous material, a manganese depolarizer and usual salts and water, said carbonaceous material being in the graphitic form and in a physical condition finer than that usually designated as 200 mesh graphite and in that form being of higher electrical resistance than 200 mesh graphite, substantially as described.

5. A depolarizing mixture for dry batteries consisting of carbonaceous material, a manganese depolarizer and suitable salts and water, said carbonaceous material being in the graphitic form and impalpable in fineness and characterized by great bulkiness, substantially as described.

6. A mixure for dry batteries containing carbonaceous material substantially all of which is in impalpable form and hydrated manganese depolarizer having when dry a conductivity not greater than that of pyrolusite, substantially as described.

7. A depolarizing mixture for dry batteries, consisting essentially of impalpable graphite and pyrolusite.

8. A depolarizing mixture for a battery comprising impalpable graphite and manganese dioxid.

9. In a dry battery, a depolarizing mixture consisting of impalpable graphite with recovered manganese and suitable salts and water.

10. In a dry battery, a depolarizing mixture containing carbonaceous material of which at least 30% is in impalpable form, together with recovered manganese.

11. A depolarizing mixture for batteries, consisting of impalpable graphite and a hydrated manganese depolarizer having a conductivity when dry less than that of pyrolusite.

12. In a dry battery, a depolarizing mixture consisting of impalpable graphite with recovered manganese and suitable salts and water, said recovered manganese being of the variety obtained as a by-product in the manufacture of saccharin.

In testimony whereof I affix my signature, in presence of two witnesses.

CHARLES F. BURGESS.

Witnesses:
L. S. LUNDER,
J. E. BYRNS.